Oct. 10, 1961     W. H. VANN     3,003,277
GUIDABLE FISHING FLOAT

Filed Sept. 29, 1958     2 Sheets-Sheet 1

INVENTOR.
WILLIAM H. VANN
BY
George H. Baldwin
ATTORNEY

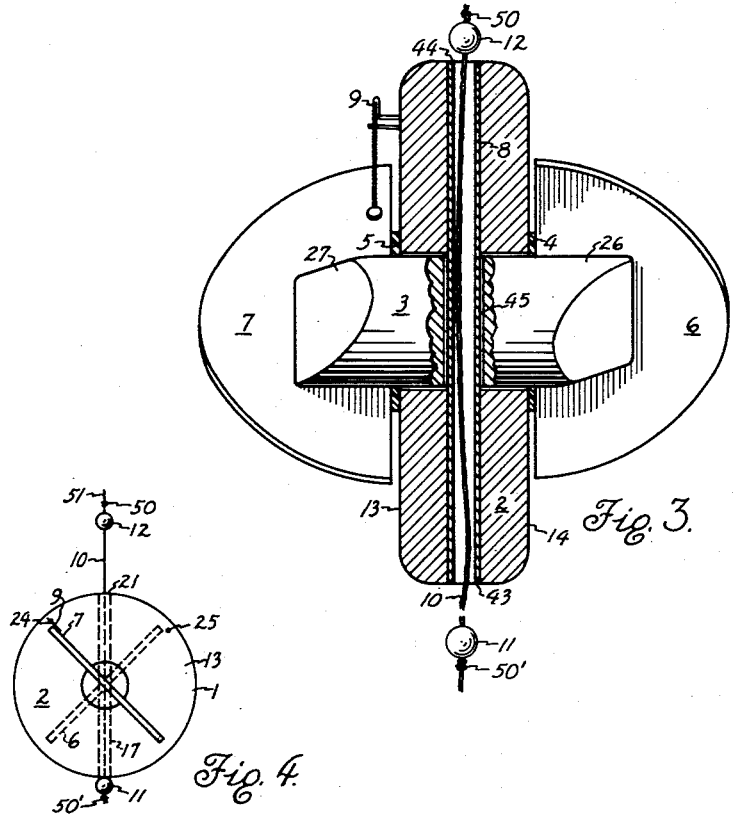
Fig. 3.
Fig. 4.
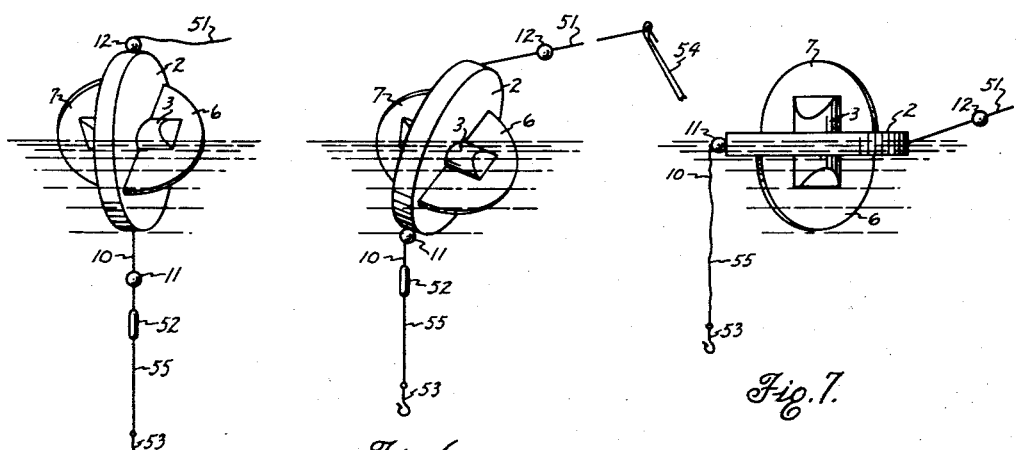
Fig. 5.
Fig. 6.
Fig. 7.
INVENTOR.
WILLIAM H. VANN
BY
ATTORNEY

United States Patent Office 3,003,277
Patented Oct. 10, 1961

3,003,277
GUIDABLE FISHING FLOAT
William H. Vann, 7014 Abbott Court,
Jacksonville 11, Fla.
Filed Sept. 29, 1958, Ser. No. 764,062
6 Claims. (Cl. 43—43.13)

This invention relates to a guidable fishing float and more particularly to a castable fishing float which tends to move in a predetermined angular direction with respect to the direction of movement of water flowing thereby.

It is a general object to provide an improved fishing float.

In some types of fishing, particularly trolling and stream fishing, the relative motion of the water determines the normal position of the hook end of the fishing line. For example, when fishing from the bank of a moving stream, the line tends to return to the bank downstream from the angler. Similarly, the fishing line tends to remain aft of a boat when the angler is trolling. In both situations, the ultimate line position is usually undesirable. In the former case the streams frequently contain line entangling branches, etc. along the banks, whereas in the latter case the line exists in a turbulent zone trailing the boat from which the fish have been frightened.

It is an object of the invention to provide a float which will carry the fishing line in a lateral direction from its normal position in moving water.

It is another object to provide a castable dirigible fishing float.

It is still another object to provide a fishing float that may be laterally guided in water so as to move relative to the angler.

It is still another object to provide a castable fishing float which is guidable in a predetermined direction, the float having adjustable guide elements which permit a relative change in the guide direction.

It is another object to provide a fishing float which may be cast into a moving stream into a position other than its ultimate floating position in water, the float being capable of assuming a position in the water in which its guide elements respond to the motion of the water and the tension in the angler's hauling-in portion of the fishing line to impart a lateral movement to the float relative to the direction of water motion.

It is another object to provide a fishing float having the characteristics set forth in the previous object and being further provided with means for changing the directional guide elements of the float so that the angler may shift from one bank to the opposite bank of a moving stream, or fish from one side or the other of a boat without having to remove the float from the line to enable a change in the lateral guide direction.

The novel features which are believed to be characteristic of this invention are set forth with particularly in the appended claims. The invention itself, however, both as to its organization and method of operation, together with further objects and advantages thereof, may best be understood by reference to the following description taken in connection with the accompanying drawings, in which:

FIGURE 3 is a side elevational view of the float as assembled and as viewed when utilized with a heavily weighted line such as illustrated in FIGURE 5, the body member being in section generally along the line 3—3 of FIGURE 1 and the shaft having certain parts broken away;

FIGURE 4 is a top view of the float in one floating position thereof and on a reduced scale, illustrating the angular relationship between the guide fins and the direction of the hauling-in portion of a fishing line, as well as the angular relationship between the fins and a line caging transverse aperture thereof;

FIGURES 5, 6 and 7 are similar side views of the float and associated apparatus illustrating several positions which the float may assume in the water under various conditions of use.

Figure 1:
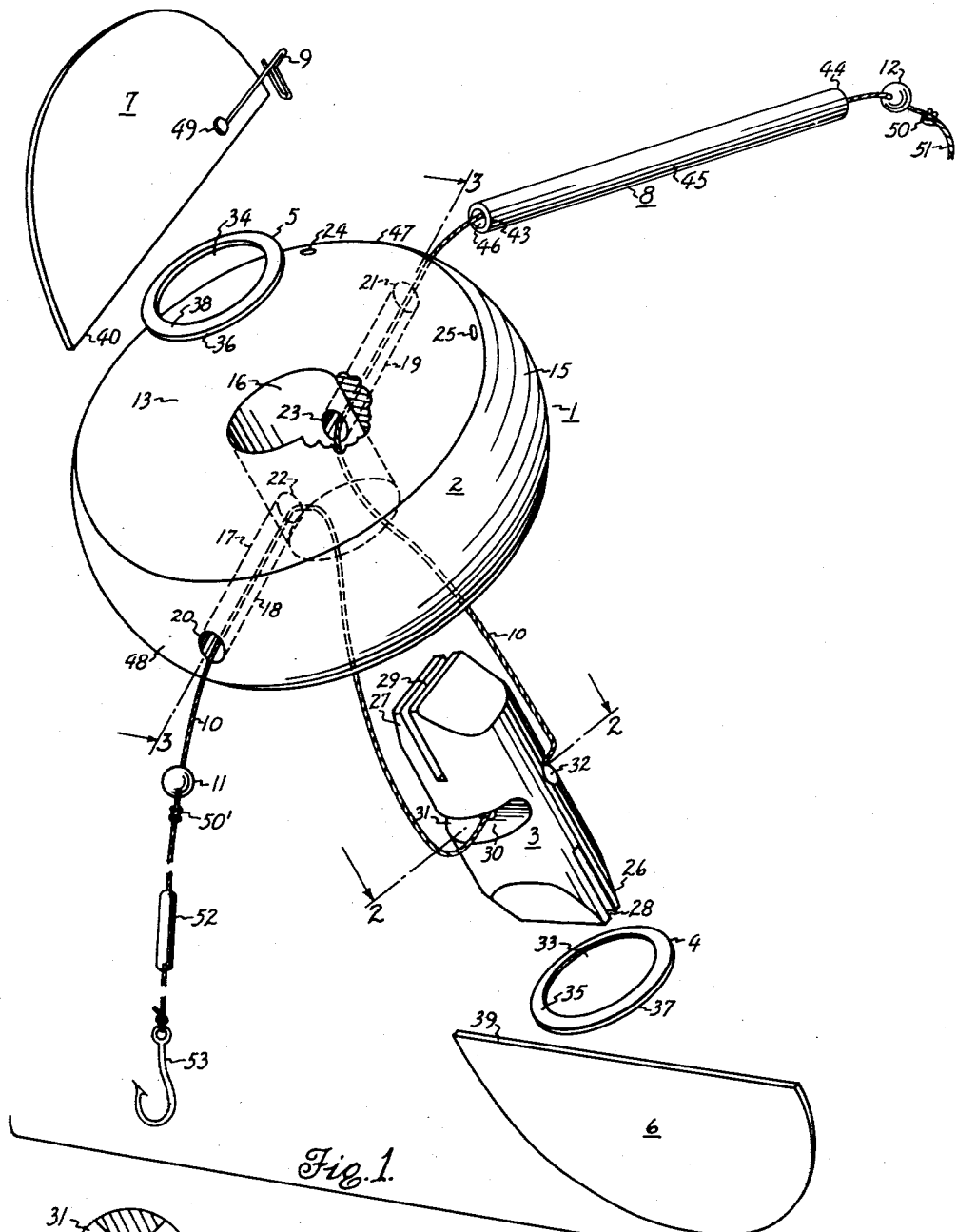
FIGURE 1 is an exploded perspective view of a fishing float embodying the concepts of the instant invention, certain parts being broken away to more clearly illustrate their relative positions.
Figure 2:
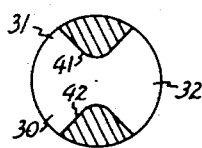
FIGURE 2 is a cross-sectional view through the shaft taken along the lines 2—2 of FIGURE 1, the sectional view showing the shape of a transverse slot or aperture through the shaft.

With particular reference to FIGURES 1, 2, 3 and 4 the guidable fishing float 1 comprises buoyant body member 2, shaft 3, washers 4 and 5, guide fins 6 and 7, line tube 8 and detent 9. Also shown are fishing line 10 and line stops 11 and 12.

The buoyant body member 2 has opposite faces 13 and 14 respectively and bulbous side edge 15. The side edge 15 has respective side edge portions 47 and 48 which are generally diametrically opposite to one another. The member 2 is generally disc-shaped and has a thickness, as measured between the respective opposite faces 13 and 14, which is less than the width of the member 2, as measured along a diameter extending across the member between the respective side edge portions 47 and 48. The body member 2 is adapted to float indiscriminately with one or the other of faces 13 and 14 downward in the water and, as will become evident, thereby being adapted to maintain one of the opposite fins 6 and 7 in a position whereby the motion of water will impart a component lateral force to the float relative to the direction of said water motion. The flat circular body member 2 has a passageway 16 extending between the opposite faces 13 and 14 and opening through the respective faces. A transverse aperture 17 intersected by passageway 16 and having opposite aperture portions 18 and 19 extends centrally across the member 2 between the opposite side edge portions 47 and 48, the aperture opening outwardly from the member at outer ends 20 and 21 of aperture portions 18 and 19 respectively. The aperture portions 18 and 19 have respective inner end portions 22 and 23 which communicate inwardly with passageway 16. As will be seen, the passageway 16 serves as a mounting within which shaft 3 is pivotable. Notches 24 and 25 are located on opposite sides of aperture 17 and selectively cooperate with detent 9 in securing shaft 3 in positions at which the attached fins 6 and 7 are at opposite angles respectively to the direction of the aperture 17.

Shaft 3 which is adapted for rotatable disposition within passageway 16 has opposite end portions 26 and 27 that are tapered inwardly towards end slots 28 and 29 respectively. Slots 28 and 29 open perpendicularly outwardly from the end extremities of the shaft 3 to enable the respective fins 6 and 7 to be perpendicularly positioned with respect to faces 14 and 13 of body member 2. The slots 28 and 29 are also perpendicularly angled with respect to each other so as to hold the fins 6 and 7 at perpendicularly angled positions with respect to each other. Centrally located along the longitudinal axis of shaft 3 is transverse slot or aperture 30 which flares radially outward to the respective ends 31 and 32 thereof. The opposite ends 31 and 32 of shaft aperture 30 are adapted to register with the respective inner ends 22 and 23 of aperture portions 18 and 19 as the shaft 3 is pivoted between a first and second position between which the angle of the respective fin is changed from a clockwise to a counterclockwise angle with respect to body member aperture 17 or vice versa.

Flat cylindrical washers 4 and 5 have respective hollow portions 33 and 34 extending therethrough and are adapted to engage about the respective end portions 26 and 27 of shaft 3, the inner faces 35 and 36 respectively engaging against member faces 14 and 13. The washers have outer faces 37 and 38 that are so disposed on shaft 3 as to serve as bearing surfaces for inner edges 39 and 40 of fins 6 and 7 respectively. Thus the washers 4 and 5 serve to space the fins from the respective faces 14 and 13 of body member 2 and also serve to prevent the shaft 3 from moving longitudinally.

Substantially planar guide fins 6 and 7 extend perpendicular to and outwardly from respective faces 14 and 13 of body member 2, the fins being perpendicularly disposed relative to one another. The fins are fittingly engaged within the slots 28 and 29 and are thus attached to the body member 2 by means of the shaft 3.

Line tube 8 is adapted to extend across the member 2 within the aperture 17, the tube 8 fittingly engaging within the opposite aperture portions 18 and 19 and extending between the respective inner ends 22 and 23 thereof through slot 30 of shaft 2. The tube 8 functions to prevent excessive line wear on the materials of which the member 2 is composed and additionally to determine the extreme limits to which the shaft 3 is rotatable within the passageway 16. Thus, the line tube 8 engages with the opposite ends of inner flared walls 41 and 42 as the shaft 3 is pivoted to one or the other extreme within passageway 16.

Spring detent 9 is secured to fin 7 by means of pin 49 and adapted to engage selectively, upon the rotation of shaft 3, within notch 24 or notch 25. In this manner the detent is adapted to secure the fins 6 and 7 in selected operative positions. By shifting detent 9 from one to the other notch, the respective angular relation between each fin and the direction of aperture 17 is reversed.

The fishing float is assembled by placing the shaft 3 within the passageway 16 of buoyant body member 2, the opposite ends 31 and 32 of shaft aperture 30 being positioned to register with the inner ends 22 and 23 respectively of aperture portions 18 and 19. An end 43 of tube 8 is then passed through portion 19 of aperture 17, through the slot 30 of shaft 3 and thence through portion 18 of body member aperture 17 to outer end 20 of aperture 17, the tube being fixed therein by the frictional forces between the tube and aperture walls or by other means so that the opposite tube ends 43 and 44 are disposed at outer ends 20 and 21 of aperture 17 with middle tube portion 45 engaging within slot 30 of shaft 3. Thereafter washers 4 and 5 are placed about respective end portions 26 and 27 of shaft 3 and fins 6 and 7 are attached, such as by forcing or gluing, within respective perpendicular slots 28 and 29 of shaft 3. Thereafter fishing line 10 may be passed through the hollow portion 46 of tube 8 and slidably attached thereto by means of line stops 11 and 12 which may be fixed to the line 10 as by means of knots such as 50 and 50'.

The angular relationship of the respective fins is best illustrated in FIG. 4. Fins 6 and 7 are mounted perpendicularly with respect to each other on shaft 3 as previously indicated. The shaft 3 is retained in the position shown in FIG. 4 by means of notch 24 and the detent 9, the latter being secured to the shaft by means of fin 7 and its attachment 49 thereto. As such, the fins 6 and 7 are secured in positions at respectively opposite and equal angles to the direction of body aperture 17 by means of detent 9 and notch 24. Thus, when viewed from above as in FIG. 4, fin 7 is positioned at a counterclockwise angle of 45° whereas fin 6 is at a clockwise angular position of 45° relative to the direction of line caging aperture 17. The hauling-in portion 51 of the fishing line 10 which extends downstream toward the float is secured within the aperture 17 and accordingly within the perpendicular angle between the respective fins 6 and 7. Consequently, not only are the fins 6 and 7 arranged at equal and respectively opposite angles to the direction of body aperture 17 but they are also arranged at equal and respectively opposite angles to the general direction of the hauling-in portion 51 of line 10. Because of its angled position relative to the direction of the water movement, it is apparent that fin 6 will cause the float as viewed in FIG. 4 to move generally in a lateral direction to the right. It will also be apparent that fin 7 would cause the same lateral movement in the same direction if the float were rotated 180° on its axis about the line 10 extending through aperture 17 and were floating with fin 7 downward instead of fin 6.

To reverse the directional guide tendency of the float 1, detent 9 is first released from its engaging position with notch 24. Thereafter shaft 2 is rotated to another position whereat spring detent 9 engages in notch 25. At this new shaft position the respective angles between the respective fins 6 and 7 and the direction of line caging aperture 17 are equal and opposite to their respective angles at their former positions. Thus as compared to the respective fin positions in FIG. 4, and as so viewed from above, in the new position of shaft 2 the angle of the respective fins is reversed, fin 7 being positioned at a clockwise angle of 45° and fin 6 being positioned at a counterclockwise angular position of 45° relative to the direction of aperture 17.

FIGURE 5 shows the position assumed by the float 1 when a heavy weight 52 is utilized near hook 53 on the hook end portion 55 of fishing line 10 and the hauling-in portion 51 of the line 10 is slack. With a slack line the float 1 is free to float along in the moving water with the aperture 17 perpendicular to the surface of the water and to rotate about the line 10 which is secured to the float within aperture 17 between line stops 11 and 12. However, as tension is applied to the hauling-in portion 51 of line 10, which is shown in FIG. 6 as extending to the float from fishing pole 54, the float 1 tilts and assumes a position in which one of the fins, such as fin 6, extends generally downward into the water. It will be apparent that the force of the moving water striking the angled fin 6 will cause the float 1 to move laterally with respect to the direction of water movement, and that such motion will continue whether or not the float turns over in the water by rotating around the axis of the line.

FIG. 7 illustrates the normal floating position of the float 1 when the hook end portion 55 of line 10 is not weighted. The body member 2 may be composed of suitable buoyant material such as styrene foam or balsa wood and is so shaped as to normally float in a position in which one of the opposite faces is downward in the water. Thus, one of the fins will assume a position in the water at which it may respond to the force of the moving water and impart lateral movement to the float. The float is suitably adapted for casting with a fishing line since it may fall randomly into the water and thereafter be caused to assume a position at which the force of the moving water will impart a lateral movement to the float. Thus, when the float is employed with an unweighted line it naturally assumes a face down position in the water and thereafter the angled fin attached to the downward face is oriented with respect to the water movement by applying a slight tension force to the hauling-in portion of the line. On the other hand, when the float is employed with a weighted line, it floats vertically as in FIGURE 4 and is caused to assume an effective position in the water again by the application of slight tension on the hauling-in portion of the line. In the latter case the force of the hauling-in portion of the line causes the float to approach a horizontal position and simultaneously to orient one or the other angled fin with respect to the direction of water movement. The float is also adapted to freely rotate about the line that passes through the body member aperture and thereby to avoid twisting the line. When the angler desires to change the angular relationship of the fins with respect to the direction of the water movement he need not remove the float to reverse the direction of the fins but may accomplish this by releasing the detent from engagement with the one notch rotating the fins on the shaft and then positioning the detent in the other notch.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A dirigible fishing float comprising a buoyant float body bounded by a peripheral edge, said body having generally parallel opposite faces spaced by a thickness dimension less than the width dimension measured between opposite portions of said edge whereby said body tends to float indiscriminately with one and the other said face downward, means to connect a fishing line to a predetermined point of said edge of said body, a respective fin extending outwardly from each said face, pivot means interconnecting said fins in perpendicular relation one to the other and perpendicular to said faces and rotatably connecting each said fin to said body, said pivot means establishing a common pivot axis for said fins generally normal to said faces whereby said fins are rotatable with rotation of said interconnecting pivot means into selected angular relations with respect to the direction of pull on said body of a fishing line attached thereto at said point.

2. A guidable fishing float comprising a buoyant circular member having opposite faces and opposite side edge portions, said member being of greater diameter than thickness and having a passageway extending between and opening through said respective faces and having a fishing line caging aperture extending in a predetermined direction between and opening at its opposite ends through said edge portions respectively, said passageway intersecting said aperture, a shaft, a respective guide fin extending perpendicularly outwardly from each said face, said fins being mounted on respective opposite ends of said shaft in and defining mutually perpendicular planes perpendicular to said faces, said shaft being rotatably disposed within said passageway and rotatable between a first position at which said fins are at opposite angles with respect to said direction and a second position at which said fins are oppositely angled relative to their respective positions at said first position of said shaft, said shaft having a transverse slot cooperating with and completing said intersected aperture through said passageway, and a releasable detent attached to one of said fins engageable with said buoyant member for releasably retaining said shaft in its said first and second positions.

3. A guidable fishing float comprising a buoyant circular member having opposite faces and opposite side edge portions, said member being of greater diameter than thickness and having a passageway extending between and opening through said faces, respectively, and having a fishing line caging aperture extending in a predetermined direction between openings at its opposite ends through said edge portions respectively, said passageway intersecting said aperture, a shaft having opposite end slots disposed perpendicularly to each other, a pair of flat washers adapted for disposition around a respective end portion of said shaft, a respective semi-circular guide fin extending outwardly from each said face and spaced therefrom by one of said pairs of washers, said fins being mounted within said opposite end slots respectively, said shaft being rotatably disposed within said passageway and rotatable between a first position at which said fins are at opposite equal angles with respect to said direction and a second position at which said fins are equally oppositely angled relative to their respective positions at said first position of said shaft, said shaft having a transverse slot cooperating with and completing said intersected aperture through said passageway, and a releasable detent attached to one of said fins engageable with said buoyant member for releasably retaining said shaft in its said first and second positions.

4. A dirigible fishing float comprising a buoyant body member having opposite parallel faces and opposite side edges and being of greater width as measured between said side edges than thickness measured between said faces whereby said body tends to float in respective floating positions with one and the other of said faces downwardly, means to connect a fishing line to a predetermined point along an edge of said body member between said faces thereof, a first vane extending outwardly from said one face and a second vane extending outwardly from said other face, and means interconnecting said vanes and mounting said vanes on said body member with the planes of said vanes mutually perpendicular and perpendicular to the planes of said faces and each at an angle of substantially forty-five degrees with respect to the direction of the fishing line connected at said point whereby the force of a water current against the submerged vane tends to move the float in the same direction laterally of the current in each of said floating positions of said body member.

5. The combination according to claim 4 wherein the means interconnecting said vanes and mounting said vanes on said body member comprises a shaft having respective ends fixed to said vanes and extending between its ends through said body member between and in a direction perpendicular to said faces.

6. The combination according to claim 5 wherein said shaft and vanes comprise an assembly rotatable with respect to said body member through 90 degrees on the axis of said shaft, and detent means releasably connect said assembly to said body member with said one of said vanes oriented 45 degrees to one side and alternatively and selectively 45 degrees to the other side of said point and fishing line direction.

References Cited in the file of this patent
UNITED STATES PATENTS

| | | |
|---|---|---|
| 574,993 | Hinckley | Jan. 12, 1897 |
| 1,232,211 | Burkman | July 3, 1917 |
| 1,361,067 | Jordan | Dec. 7, 1920 |
| 1,361,602 | Marks | Dec. 7, 1920 |
| 1,530,835 | Koepke | Mar. 24, 1925 |
| 2,484,162 | Golembeski | Oct. 11, 1949 |
| 2,608,790 | McFarland | Sept. 2, 1952 |
| 2,749,646 | Hall | June 12, 1956 |
| 2,826,851 | Borgogno | Mar. 18, 1958 |